United States Patent Office 3,060,367
Patented Oct. 23, 1962

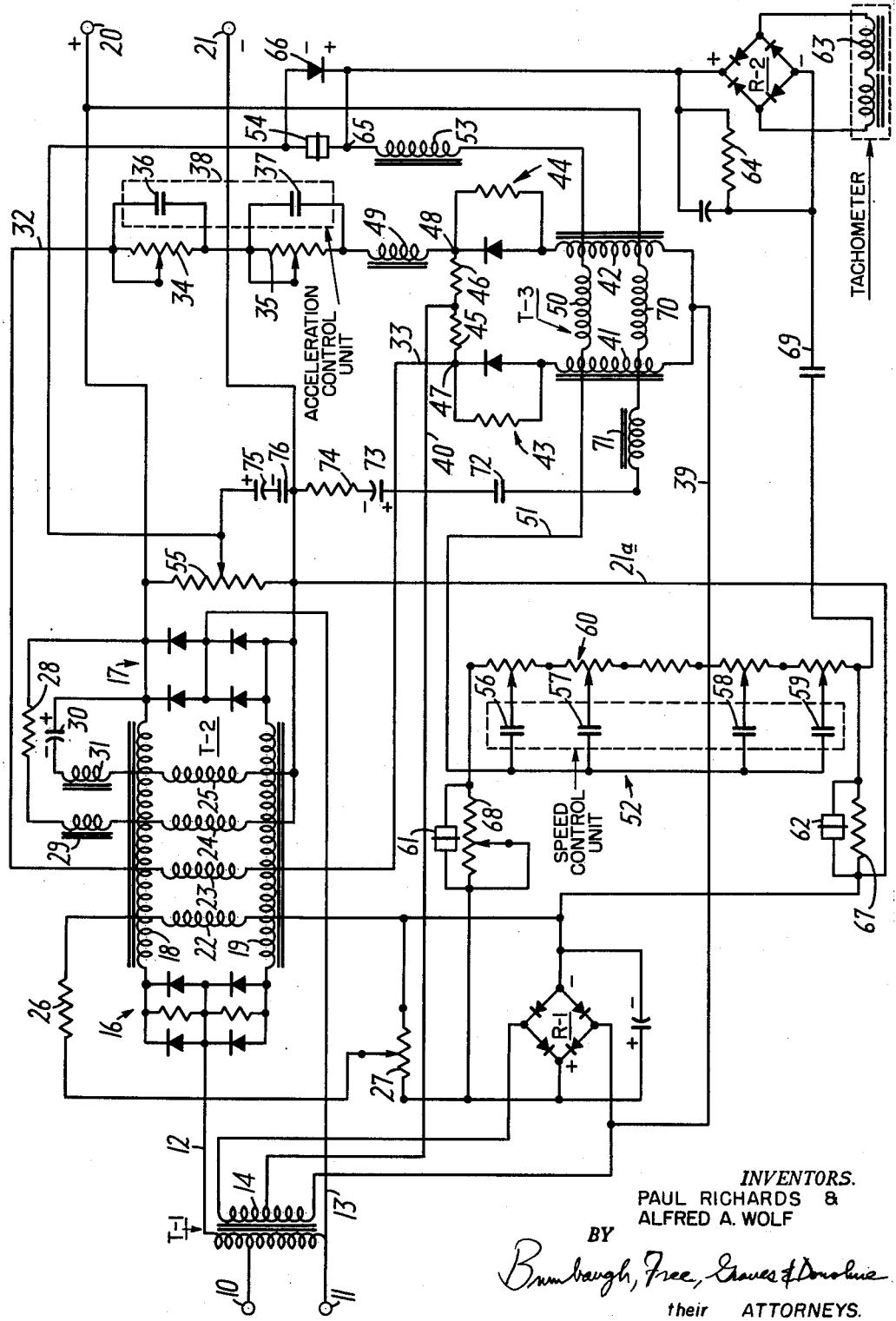

3,060,367
MOTOR GENERATOR FIELD CONTROL CIRCUIT
Paul Richards, Roselle, N.J., and Alfred A. Wolf, York, Pa., assignors to General Dynamics Corporation, New York, N.Y., a corporation of Delaware, and Fidelity Instrument Corporation, York, Pa., a corporation of Pennsylvania
Filed Oct. 29, 1959, Ser. No. 849,613
11 Claims. (Cl. 322—39)

This invention relates to a circuit for controlling the generator field of a motor generator set for example and, more particularly, to a new and improved field control circuit providing precise control over an extended range.

One form of elevator drive system employs a D.C. hoist motor supplied with voltage from the generator of a Ward-Leonard type motor generator set. Starting and stopping of the hoist motor is controlled by the application and removal of a D.C. voltage at the main shunt field terminals of the D.C. generator in the motor generator set and the speed and direction of the motor are governed by the magnitude and polarity of the applied voltage.

It will be apparent that the actual load in an elevator car without some form of compensation will cause a considerable difference in speed in the opposing directions of travel, thus interfering with the accurate positioning of the car as it stops at a floor. Although various remedies for this difficulty have been proposed, such as the well known series-field regeneration arrangements, they have many inadequacies. For example, when the ratio between the maximum elevator speed and the highest speed at which the elevator can be stopped accurately is greater than twenty-five-to-one, variations in resistance due to temperature changes in the generator and hoist motor, residual magnetism in the generator, pole pieces and the like, interfere with the performance of regenerative systems. Moreover, for smoothness and efficiency of operation, the rate of change of voltage applied to the generator shunt field should be as nearly constant as possible rather than proceeding in abrupt steps as in many conventional systems.

Accordingly, it is an object of the present invention to provide a new and improved circuit for controlling the generator shunt field of a motor generator set which is free of the above-mentioned disadvantages.

Another object of the invention is to provide a control circuit capable of providing a uniform rate of change of voltage during acceleration and deceleration.

An additional object of the invention is to provide a control circuit capable of precise operation over a wider range of output voltages than has been possible heretofore.

A further object of the invention is to provide a control circuit of the above character operable in conjunction with a speed sensing tachometer.

These and other objects and advantages of the invention are attained by utilizing a two stage magnetic amplifier to provide field potential for the generator of a motor generator set wherein the first stage amplifier produces a control signal representative of the difference between a reference potential and the actual field potential. If desired, a speed sensing device may be connected to the first stage input so that the reference signal is normally compared with a signal from the speed sensing device but arranged so that the signal representing the output of the system can supersede the signal from the speed sensing device.

In the second stage of the system, a magnetic amplifier generates a motor generator field potential in accordance with the control signal from the first stage and the circuit coupling the two amplifiers includes means to permit variation in the rate of change of the control signal. In addition, the second stage amplifier includes a fixed bias winding set to control the minimum operating level of the amplifier at a predetermined point while a variable bias control winding responds to the output signal from the amplifier to shift its operating point as the output voltage changes. A fourth control winding in this stage includes a reactive circuit arranged so that the overall rate of change of output potential from the amplifier is linear with respect to time.

Further objects and advantages of the invention will be apparent from a reading of the following description in conjunction with the accompanying drawing which is a schematic circuit diagram illustrating a representative embodiment of the field control circuit of the invention.

As illustrated in the drawing, power is supplied to the control circuit of the invention through two terminals 10 and 11 from any conventional source of alternating current to the primary winding of a transformer T-1. This transformer acts as an auto-transformer supplying appropriate output voltage at two conductors 12 and 13 for energization of a magnetic amplifier reactor T-2 and also includes a secondary winding 14 providing A.C. power to a full wave rectifier unit R-1. Preferably, the transformer T-1 is arranged so that the A.C. potential across the lines 12 and 13 is approximately 240 volts, while the winding 14 generates 120 volts so that the full wave rectifier unit R-1 provides a D.C. reference voltage of approximately 85 volts.

In order to drive the magnetic amplifier T-2 which comprises the second stage of the system, two full wave rectifier units 16 and 17 apply rectified voltage from the conductors 12 and 13 to opposite ends of the two main windings 18 and 19 of the amplifier, respectively. Each of these windings is connected at one end to one of two field potential output terminals 20 and 21 normally producing a maximum D.C. potential of approximately 170 volts between these terminals, the terminal 21 being joined to the negative side of the rectifier unit R-1 through a conductor 21a.

Four control windings 22, 23, 24, and 25 are included in the magnetic amplifier T-2 to regulate the D.C. output voltage and provide efficient elevator speed control in accordance with the present invention. The first of these windings 22 is connected through a resistor 26 and a potentiometer 27 to the reference D.C. voltage supplied by the rectifier R-1, as previously described, thereby inducing a fixed bias potential in the magnetic amplifier. By adjusting the setting of the potentiometer 27, this bias, and consequently the minimum operating point of the amplifier, may be set at any desired level and preferably this level is selected to provide the lowest desired amplifier output potential at the terminals 20 and 21.

In addition, the control winding 24 is arranged to supply a variable bias potential to the amplifier in accordance with the operating level of the system. To this end, positive feedback voltage from the output energizes the winding 24 through a series resistor 28 and choke 29, the resistor being selected to limit the feedback voltage to the proper value and the choke being included to smooth out any ripple from the feedback voltage. It will be apparent that the unique arrangement of the fixed bias winding and the feedback controlled bias winding results in an automatic variable bias which maintains the operating point of the amplifier within the range of driving power available from a control signal produced by the first amplifier stage described hereinafter. Consequently, this makes it possible to maintain full control of the output voltage of the system over a maximum-to-minimum voltage ratio of at least fifty-to-one.

In accordance with another feature of the present invention, a reactive circuit including, for example, a series capacitor 30 and inductance 31, is connected from the output of the second stage amplifier T-2 to energize the control winding 25. By an appropriate selection of the values of these reactive elements in conjunction with that of the winding 25, this circuit can be adjusted to introduce an extended linear rate of change in the response time of the magnetic amplifier and, in a particular instance, a forty microfarad capacitor and a twenty henry inductance were found suitable for this purpose. With this arrangement, the rate of change of the output voltage of the system is made linear with respect to time regardless of the rate of change of the control signal.

The fourth winding 23 in the second stage magnetic amplifier is coupled to receive control voltage signals from a preamplifier T-3 through two conductors 32 and 33, and in order to regulate the rate of change of these control signals and thereby regulate the rate of acceleration and deceleration of the elevator hoist motor, this coupling circuit includes two series rheostats 34 and 35. Either or both of these rheostats may be shorted out of the circuit by closing of corresponding relay contacts 36 and 37 in a conventional acceleration control unit 38, which is not illustrated in detail since it forms no part of the present invention. It will be understood, however, that the control unit is effective to close one or both of these contacts when an increased rate of acceleration is desired and open one or both of the contacts when a decreased rate is desired.

Driving power for the preamplifier T-3 is derived from the secondary winding 14 of the power transformer T-1 through two conductors 39 and 40 connected to one end and to a center tap of the winding, respectively. Two reactor windings 41 and 42, each forming a separate arm of a bridge network and constituting the main windings of the reactor T-3, as connected at one end to the conductor 39 and have circuits 43 and 44 comprising parallel-connected resistance and rectifier elements joined to their unconnected ends, respectively. The other arms of the bridge network are formed by two resistors 45 and 46, each joined at one end to the conductor 40 and forming junctions 47 and 48 at their other ends with the circuits 43 and 44, respectively. Output signals indicating unbalance of the bridge network are transmitted to the control winding 23 of the magnetic amplifier T-2 through the conductor 33 which is connected to the junction 47 and through the line 32 which leads to the junction 48 through the rheostats 34 and 35 and a filter choke 49. As a result, any variation from the balanced condition generates a control signal which is applied to the second stage amplifier, producing a corresponding change in the voltage at the output terminals 20 and 21.

In order to effect unbalance of the bridge network in accordance with any difference between the actual generator field potential and the desired field potential, the magnetic amplifier T-3 includes a control winding 50 connected at one end through a conductor 51 to a conventional speed control unit 52 providing reference voltage proportional to the desired hoist motor speed and at the other end through a series inductance 53 and a normally closed tachometer relay contact 54 to the movable contact of a potentiometer 55 connected across the output of the second stage amplifier T-2. The value of the inductance 53 is selected to provide sufficient time lag in the control winding circuit to prevent oscillation or hunting of the system and, in a particular case, an inductance of twenty henries was found to be satisfactory. As described below, the normally closed tachometer relay contact 54 is operated along with other tachometer relay contacts referred to hereinafter by energization of the winding (not illustrated) of a tachometer relay arranged to adapt the system for tachometer control.

According to conventional magnetic amplifier practice, the mounting of the control winding 50 is arranged so that a D.C. current in one direction will cause the reactance in one of the reactor windings 41 and 42 to increase and that of the other winding to decrease, while a current in the opposite direction will cause a reverse effect. Thus, the resulting rectified voltages appearing across the resistors 45 and 46 forming the other two arms of the bridge will be opposed and unequal, the degree of inequality being proportional to the difference between the reference voltage supplied by the speed control unit 52 and the potential at the contact of the potentiometer 55, which is in direct proportion to the output voltage of the system. Inasmuch as the control winding 23 of the second stage amplifier is connected across these resistors at the junctions 47 and 48 in the manner described above, the difference between the rectified voltages across these resistors is utilized to control the second stage amplifier T-2.

Inasmuch as the control current through the winding 23 is proportional to the difference between the output voltage and a reference voltage, the system is maintained as close to the desired output potential value as the required driving current for the control winding will permit. Consequently, the degree of control available is affected by the amount of resistance in series with the preamplifier output and the control winding 23. However, as previously pointed out, it is desirable at certain times to include the resistances 34 and 35 in the coupling circuit to control acceleration and deceleration rates. Accordingly, opening of the acceleration control unit contacts 36 and 37 permits the desired acceleration control when substantial current is flowing through the control circuit and closing of one or both of these controls provides increased precision of control of the output voltage of the system when it is very close to the desired output voltage.

As previously mentioned, the speed control unit 52 is of the usual type and includes four normally open relay contacts 56, 57, 58, and 59, each arranged when closed to connect the conductor 51 to a selected point on a voltage divider 60, the divider being connected across the rectifier R-1 through two normally closed tachometer relay contacts 61 and 62. Consequently, any of four selected reference potentials can be applied to one end of the control winding 50 by actuation of a relay closing an appropriate contact in the speed control unit 52.

If desired, output signals from a conventional speed sensing tachometer may be used with the field control circuit of the present invention to provide improved speed regulation. As illustrated in the drawing, voltage signals generated by a tachometer generator winding 63 are rectified by a conventional full wave rectifier unit R-2 and applied across a load resistor 64, the negative side of the output being connected through a normally open tachometer relay contact 69 to the negative end of the voltage divider 60 while the positive end is joined to the circuit of the control winding 50 at a point 65 between the relay contact 54 and the inductance 53.

In addition, a rectifier element 66 is connected in parallel with the contact 54 so that its positive side is toward the rectifier unit R-2. This arrangement isolates the output voltage of the system from the control winding 50 except when the potential from the potentiometer is more positive than either the tachometer signal potential at the load resistor 64 or the reference voltage from the conductor 51. As a result, the tachometer output signal is normally compared with the reference voltage, but in the event that the tachometer signal does not properly represent the elevator speed, a fail-safe feature is provided to prevent runaway voltage from being developed by the control circuit. Thus, whenever tachometer voltage signal becomes less positive than the potentiometer signal representing the output voltage, the rectifier 66 conducts and permits the potentiometer signal to supersede the tachometer signal to control the operation of the amplifier T-3.

In order to prevent the potentiometer signal from interfering with the action of the tachometer system under the usual conditions, a fixed bias voltage is introduced between the tachometer output voltage at the load resistor 64 and the magnetic amplifier voltage at the potentiometer 55. To accomplish this, a resistor 67 is connected across the normally closed tachometer relay contact 62. Inasmuch as this contact is open whenever tachometer control is desired placing the resistor 67 between the conductor 21a connected to the negative output of the system and the tachometer load resistor 64, the effect is to hold the negative end of the load resistor 64 at a level which is slightly positive with respect to the negative end of the potentiometer 55. Consequently, the potentiometer voltage applied to the rectifier element 66 at a given speed will be slightly less positive than the tachometer signal applied at that point in response to the same drive motor speed. Also, a potentiometer 68 is connected across the normally closed tachometer relay contact 61 and this is adjusted to match the reference voltages from the voltage divider 60 to the tachometer output signals developed at the desired elevator speeds when the contacts 61 and 62 are opened. To assure proper operation at all speeds, the movable contact of the potentiometer 55 should be set so that the negative bias at the conductor 21a with respect to the load resistor 64 is substantially maintained at the maximum output voltage of the system.

Because of the different electrical time constants of the tachometer generator circuit and the output circuit of the magnetic amplifier T-2, a stabilizing circuit is included to prevent hunting when the tachometer is used. This circuit utilizes a second control winding 70 in the amplifier T-3 having one end joined to the positive output of the amplifier T-2 and the other end connected through an inductance 71, a normally open tachometer relay contact 72, a capacitor 73, and a resistor 74 to the negative side of the output from the system. In addition, a capacitor 75 is connected between the movable contact of the potentiometer 55 and the negative output conductor through a normally opened tachometer relay contact 76, the resistor 74, the capacitors 73 and 75, and the inductance 71 being selected to introduce sufficient time lag into the operation of the magnetic amplifier T-3 to prevent hunting of the system.

In operation, A.C. power is applied to the input terminals 10 and 11 energizing the magnetic amplifier T-2 through the rectifier units 16 and 17. A fixed D.C. bias current supplied from the rectifier unit R-1 is passed through the control winding 22 setting the amplifier output at its minimum operating point. Also, the voltage divider 60 is energized from this rectifier unit while the preamplifier T-3 is energized from the winding 14. If no tachometer speed control is desired, the contacts 54, 61, and 62 are in their normally closed condition and the contacts 69, 72, and 76 remain open.

When a given hoist motor speed is desired, a corresponding contact in the group 56, 57, 58, and 59 of the speed control unit 52 is closed, applying a corresponding potential to one end of the control winding 50. If the voltage at the potentiometer 55 differs from this indicating that the output voltage of the system is not at the level required to drive the hoist motor at that speed, current flows through the winding 50 unbalancing the bridge and applying current through the control winding 23 of the amplifier T-2 in a direction to reduce the difference. By closing one or both of the contacts 36 and 37, the rate at which such changes affect the output of the system can be varied. As the output voltage of the amplifier T-2 changes, the current through the variable bias control winding 24 also changes shifting the amplifier operating level and providing an increased range of control. Also, the control winding 25 responds to any change in output voltage to assure a substantially linear rate of voltage change with time.

With the tachometer relay contacts 54, 61, and 62 opened and the contacts 69, 72, and 76 closed, the circuit is normally responsive to signals generated by the tachometer generator 63 and applied to the winding 50. As previously described, if the tachometer fails to provide a signal representative of the actual hoist motor speed, the signal from the potentiometer 55 is transmitted through the rectifier element 66 superseding the tachometer signal and preventing the control circuit from producing a runaway voltage.

Although the invention has been described herein with reference to a specific embodiment, many modifications and variations therein will readily occur to those skilled in the art. Accordingly, all such modifications and variations are included within the intended scope of the invention as defined by the following claims.

We claim:

1. A motor generator field control system comprising first magnetic amplifier means providing an output voltage and including a control winding, means providing a signal representative of the output voltage of the first magnetic amplifier means, reference voltage means producing a reference voltage signal representative of a desired output voltage from the system, bridge network means including second magnetic amplifier means forming two arms of the bridge and having a control winding responsive to differences between the reference voltage signal and the signal representative of the first magnetic amplifier output voltage, variable bias winding means in the first magnetic amplifier means responsive to the output of the first amplifier means to provide a bias which varies the control point of the first magnetic amplifier means with the output level of the system, and circuit means coupling the output of the bridge network means to the control winding means of the first magnetic amplifier means.

2. A motor generator field control system comprising magnetic amplifier means providing an output voltage and including a control winding, means providing a signal representative of the output voltage of the magnetic amplifier means, reference voltage means producing a reference voltage signal representative of a desired output voltage from the system, means for comparing the reference voltage signal and the signal representative of the output voltage of the system and providing an output signal representative of the difference between the two, circuit means coupling the output of the comparing means to the control winding means, fixed bias winding means in the magnetic amplifier means set to bias the amplifier at a predetermined point, and variable bias winding means in the magnetic amplifier means responsive to the output of the amplifier means to provide a bias which varies the control point of the amplifier with the output level of the system.

3. A motor generator field control system comprising magnetic amplifier means providing an output voltage and including a control winding, means providing a signal representative of the output voltage of the magnetic amplifier means, reference voltage means producing a reference voltage signal representative of a desired output voltage from the system, means for comparing the reference voltage signal and the signal representative of the output voltage of the system and providing an output signal representative of the difference between the two, circuit means coupling the output of the comparing means to the control winding means, additional control winding means in the magnetic amplifier means, and circuit means responsive to the output of the amplifier means including selected impedance elements for energizing the additional control winding means to provide a substantially linear rate of voltage change in the output of the system.

4. A system according to claim 3 wherein the circuit means responsive to the output of the amplifier means includes series-connected inductance and capacitance means.

5. A field control system for a motor generator providing variable power for a drive motor comprising magnetic amplifier means providing an output voltage and including a control winding, means providing a signal representative of the output voltage of the magnetic amplifier means, reference voltage means producing a reference voltage signal representative of a desired output voltage from the system, means for comparing the reference voltage signal and the signal representative of the output voltage of the system and providing an output signal representative of the difference between the two, circuit means coupling the output of the comparing means to the control winding means, tachometer means responsive to the speed of the drive motor providing an output voltage representative thereof, and circuit means coupling the tachometer output and the means providing a signal representative of the output voltage of the magnetic amplifier means in superseding relation for application to the comparing means.

6. A motor generator field control system comprising first magnetic amplifier means providing an output voltage and including a control winding, means providing a signal representative of the output voltage of the first magnetic amplifier means, reference voltage means producing a reference voltage signal representative of a desired output voltage from the system, bridge network means including second magnetic amplifier means forming two arms of the bridge and having a control winding responsive to differences between the reference voltage signal and the signal representative of the first magnetic amplifier output voltage, circuit means coupling the output of the bridge network means to the control winding means of the first magnetic amplifier means, fixed bias winding means in the first magnetic amplifier means set to bias the amplifier at a predetermined point, and variable bias means in the first magnetic amplifier means responsive to the output of the system to provide a bias which varies the control point of the first magnetic amplifier means with the output level of the system.

7. A motor generator field control system comprising first magnetic amplifier means providing an output voltage and including a control winding, means providing a signal representative of the output voltage of the first magnetic amplifier means, reference voltage means producing a reference voltage signal representative of a desired output voltage from the system, bridge network means including second magnetic amplifier means forming two arms of the bridge and having a control winding responsive to differences between the reference voltage signal and the signal representative of the first magnetic amplifier output voltage, circuit means coupling the output of the bridge network means to the control winding means of the first magnetic amplifier means, additional control winding means in the first magnetic amplifier means, and circuit means responsive to the output of the system including selected impedance elements for energizing the additional control winding means to provide a substantially linear rate of voltage change in the output of the system.

8. A field control system for a motor generator providing variable power to a drive motor comprising first magnetic amplifier means providing an output voltage and including a control winding, means providing a signal representative of the output voltage of the first magnetic amplifier means, reference voltage means producing a reference voltage signal representative of a desired output voltage from the system, bridge network means including second magnetic amplifier means forming two arms of the bridge and having a control winding responsive to differences between the reference voltage signal and the signal representative of the first magnetic amplifier output voltage, circuit means coupling the output of the bridge network means to the control winding means of the first magnetic amplifier means, tachometer means responsive to the speed of the drive motor providing an output voltage representative thereof, and circuit means coupling the tachometer output and the means providing a signal representative of the output voltage of the first magnetic amplifier means in superseding relation for application to the control winding means of the second magnetic amplifier means.

9. A field control system according to claim 8 wherein the circuit means coupling the tachometer output and the means providing a signal representative of the output voltage includes unidirectional current conducting means preventing the signal representative of the output voltage from affecting the second magnetic amplifier means whenever it is negative with respect to the tachometer means output signal.

10. A system according to claim 8 including second control winding means in the second magnetic amplifier means and stabilizing circuit means connected between the first magnetic amplifier output and the second control winding means including impedance means arranged to prevent hunting of the system.

11. A system according to claim 8 including bias means for shifting the level of the voltage signal provided by the reference voltage means with respect to the level of the tachometer means output signal so that, at any given drive motor speed, the tachometer means output signal provides the voltage applied to the control winding of the second magnetic amplifier means.

References Cited in the file of this patent

UNITED STATES PATENTS

| | | |
|---|---|---|
| 2,610,315 | McKendry | Sept. 9, 1952 |
| 2,653,293 | Huge | Sept. 22, 1953 |
| 2,793,338 | Rhyne | May 21, 1957 |
| 2,897,293 | Morgan et al. | July 28, 1959 |
| 2,904,744 | De Lalio | Sept. 15, 1959 |